United States Patent
Mukherjee et al.

(10) Patent No.: US 10,402,889 B1
(45) Date of Patent: *Sep. 3, 2019

(54) METHOD, SYSTEM, AND COMPUTER READABLE MEDIUM FOR RENDERING A GRAPHICAL USER INTERFACE VISUALLY INDICATING SEARCH RESULTS INCLUDING RELATED SUGGESTED PRODUCTS

(71) Applicant: Google LLC, Mountain View, CA (US)

(72) Inventors: Rajat Mukherjee, San Jose, CA (US); Abhinandan S. Das, Sunnyvale, CA (US); Jennifer Liu Low, Cupertino, CA (US); Dan Moisa, Mountain View, CA (US)

(73) Assignee: Google LLC, Mountain View, CA (US)

( * ) Notice: Subject to any disclaimer, the term of this patent is extended or adjusted under 35 U.S.C. 154(b) by 1 day.

This patent is subject to a terminal disclaimer.

(21) Appl. No.: 15/694,272

(22) Filed: Sep. 1, 2017

Related U.S. Application Data

(63) Continuation of application No. 14/070,629, filed on Nov. 4, 2013, now Pat. No. 9,767,504, which is a
(Continued)

(51) Int. Cl.
| | |
|---|---|
| *G06Q 30/00* | (2012.01) |
| *G06Q 30/06* | (2012.01) |
| *G06Q 30/02* | (2012.01) |
| *G06F 16/245* | (2019.01) |
| *G06F 16/248* | (2019.01) |
| *G06F 16/9535* | (2019.01) |

(52) U.S. Cl.
CPC ....... *G06Q 30/0631* (2013.01); *G06F 16/245* (2019.01); *G06F 16/248* (2019.01); *G06F 16/9535* (2019.01); *G06Q 30/0253* (2013.01); *G06Q 30/0627* (2013.01)

(58) Field of Classification Search
CPC ..... G06Q 30/06; G06Q 30/0601–0643; G06Q 30/08
See application file for complete search history.

(56) References Cited

U.S. PATENT DOCUMENTS

| | | |
|---|---|---|
| 7,003,515 B1 | 2/2006 | Glaser et al. |
| 7,757,170 B2 | 7/2010 | Billsus et al. |

(Continued)

OTHER PUBLICATIONS

Liang et al., "A semantic-expansion approach to personalized knowledge recommendation," Decision Support Systems (2007), 12 pages.

*Primary Examiner* — William J Allen
(74) *Attorney, Agent, or Firm* — Fish & Richardson P.C.

(57) ABSTRACT

Methods, systems, and apparatus, including computer programs encoded on a computer storage medium, for related search suggestions for products. In one aspect, a method includes receiving a query for searching documents wherein the query specifies a first product. A number of occurrences of the first product in a plurality of prior queries of the documents submitted by users is determined. A product category for the first product is determined based on one or more attributes associated with the first product, the category having a predetermined plurality of category attributes. A suggested product is selected wherein the suggested product is associated with attributes that satisfy the category attributes.

20 Claims, 7 Drawing Sheets

Related U.S. Application Data continuation of application No. 12/511,289, filed on Jul. 29, 2009, now Pat. No. 8,612,306.

(56) References Cited

U.S. PATENT DOCUMENTS

| | | | |
|---|---|---|---|
| 8,612,306 B1 * | 12/2013 | Mukherjee | G06Q 30/02 705/26.5 |
| 8,660,912 B1 * | 2/2014 | Dandekar | G06Q 30/06 705/26.1 |
| 9,767,504 B1 * | 9/2017 | Mukherjee | G06Q 30/02 |
| 2002/0152126 A1 | 10/2002 | Lieu et al. | |
| 2005/0021420 A1 | 1/2005 | Michelitsch et al. | |
| 2005/0071251 A1 | 3/2005 | Linden et al. | |
| 2005/0102202 A1 | 5/2005 | Linden et al. | |
| 2005/0144086 A1 | 6/2005 | Speiser et al. | |
| 2007/0100650 A1 | 5/2007 | Ramer et al. | |
| 2007/0185775 A1 | 8/2007 | Lawton | |
| 2007/0250390 A1 | 10/2007 | Lee et al. | |
| 2007/0276857 A1 | 11/2007 | Fujio et al. | |
| 2007/0282695 A1 | 12/2007 | Toper et al. | |
| 2008/0065469 A1 | 3/2008 | Specter et al. | |
| 2008/0215453 A1 | 9/2008 | Yoshii | |
| 2008/0243632 A1 | 10/2008 | Kane et al. | |
| 2008/0243638 A1 | 10/2008 | Chan et al. | |
| 2008/0270250 A1 | 10/2008 | Bolivar et al. | |
| 2008/0270398 A1 | 10/2008 | Landau et al. | |
| 2009/0234712 A1 | 9/2009 | Kolawa et al. | |
| 2009/0234878 A1 | 9/2009 | Herz et al. | |
| 2009/0292696 A1 | 11/2009 | Shuster | |
| 2009/0299880 A1 | 12/2009 | Stoppelman | |
| 2010/0145939 A1 | 6/2010 | Kumar et al. | |

* cited by examiner

METHOD, SYSTEM, AND COMPUTER READABLE MEDIUM FOR RENDERING A GRAPHICAL USER INTERFACE VISUALLY INDICATING SEARCH RESULTS INCLUDING RELATED SUGGESTED PRODUCTS

CROSS-REFERENCE TO RELATED APPLICATIONS

This is a continuation of U.S. application Ser. No. 14/070,629, filed on Nov. 4, 2013, which is a continuation of U.S. application Ser. No. 12/511,289, filed on Jul. 29, 2009 (now U.S. Pat. No. 8,612,306). The disclosures of the prior applications are considered part of and are incorporated by reference in the disclosure of this application.

BACKGROUND

The present disclosure relates to determining related search suggestions. Internet search engines are used to search for information on the World Wide Web. As shown in FIG. 1A, a search engine graphical user interface (GUI) 100a is illustrated along with a user-specified query that has been entered in text field 102a. When the user selects a send button 104a, the query is submitted to the search engine which then processes the query. The search engine returns a result list 106a that is an ordered list of references to documents (e.g., web pages) that are responsive to the query. This result list 106a is then presented in the GUI 100a.

SUMMARY

In general, one aspect of the subject matter described in this specification can be embodied in a method that includes a method comprising receiving a query for searching documents wherein the query specifies a first product; determining a number of occurrences of the first product in a plurality of prior queries of the documents submitted by users and verifying that the number of occurrences satisfies a criterion; determining a product category for the first product based on one or more attributes associated with the first product, the category having a predetermined plurality of category attributes; selecting a suggested product wherein the suggested product is associated with attributes that satisfy the category attributes; and providing the suggested product in response to the query. Other embodiments of this aspect include corresponding systems, apparatus, and computer program products.

These and other aspects can optionally include one or more of the following features. The query can comprise one or more of a product brand and a product model. The query can comprise the product brand, and further comprising: identifying as the suggested product, a popular product model associated with the product brand. The category attributes can comprise attributes that occur in one or more of the prior queries. One of the category attributes can be received from one or more of: one of the users, a system administrator, a merchandiser, and a manufacturer of the product. Selecting the suggested product can be based on a number of times documents containing the suggested product are selected by the users from results responsive to one or more of the prior queries. Selecting the suggested product can be based on a promotion associated with the suggested product. A price for the suggested product can be provided. User selection of the suggested product can initiate a process in which a user purchases the suggested product. User selection of the suggested product's price can initiate a process in which a user views one or more of product ratings, product reviews, product previews and product comparisons. Input can be received selecting the suggested product and causing the documents to be searched for the suggested product. The query can comprise a product brand and a product model, and wherein selecting the suggested product comprises selecting one or more other product models of the product brand where a distance between attributes of the other product models and the product model satisfies a criterion.

Particular implementations of the described subject matter can realize one or more of the following advantages. By using a product database that has information about various products, product brands, manufacturers, attributes and other related information, a precise and complete set of related product models can be identified in response to a product query. Related product model suggestions are further provided in response to product queries. The ability to purchase product models identified in product model suggestions is possible through user interaction with GUI elements accompanying the suggestions.

The details of one or more implementations are set forth in the accompanying drawings and the description below. Other features, aspects, and advantages will become apparent from the description, the drawings, and the claims.

DESCRIPTION OF DRAWINGS

Like reference symbols in the various drawings indicate like elements.

DETAILED DESCRIPTION

Figure 1A:
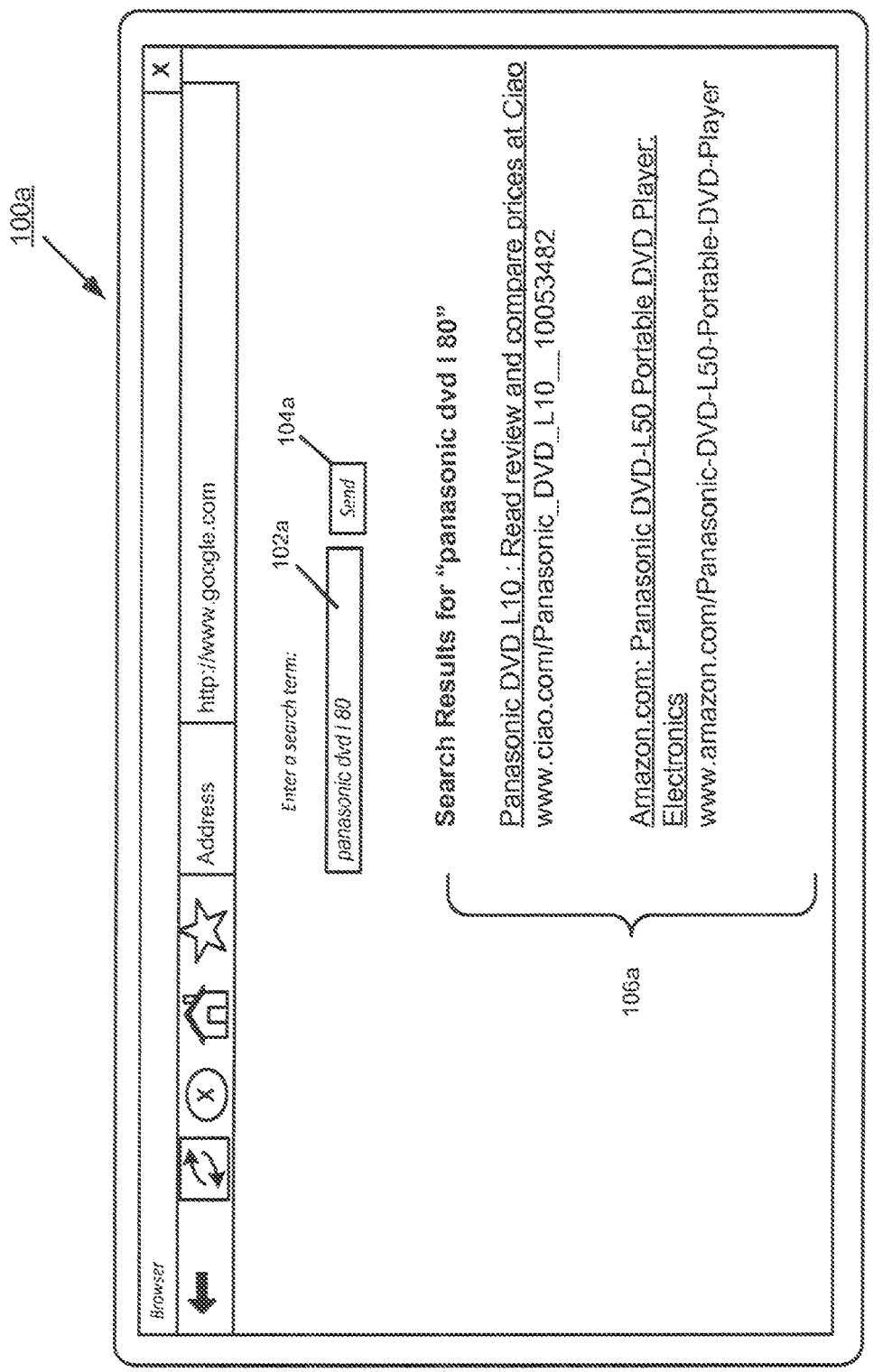
FIG. 1A shows a prior art example GUI for a search engine that can accept a query and can provide a list of results.
Figure 1B:
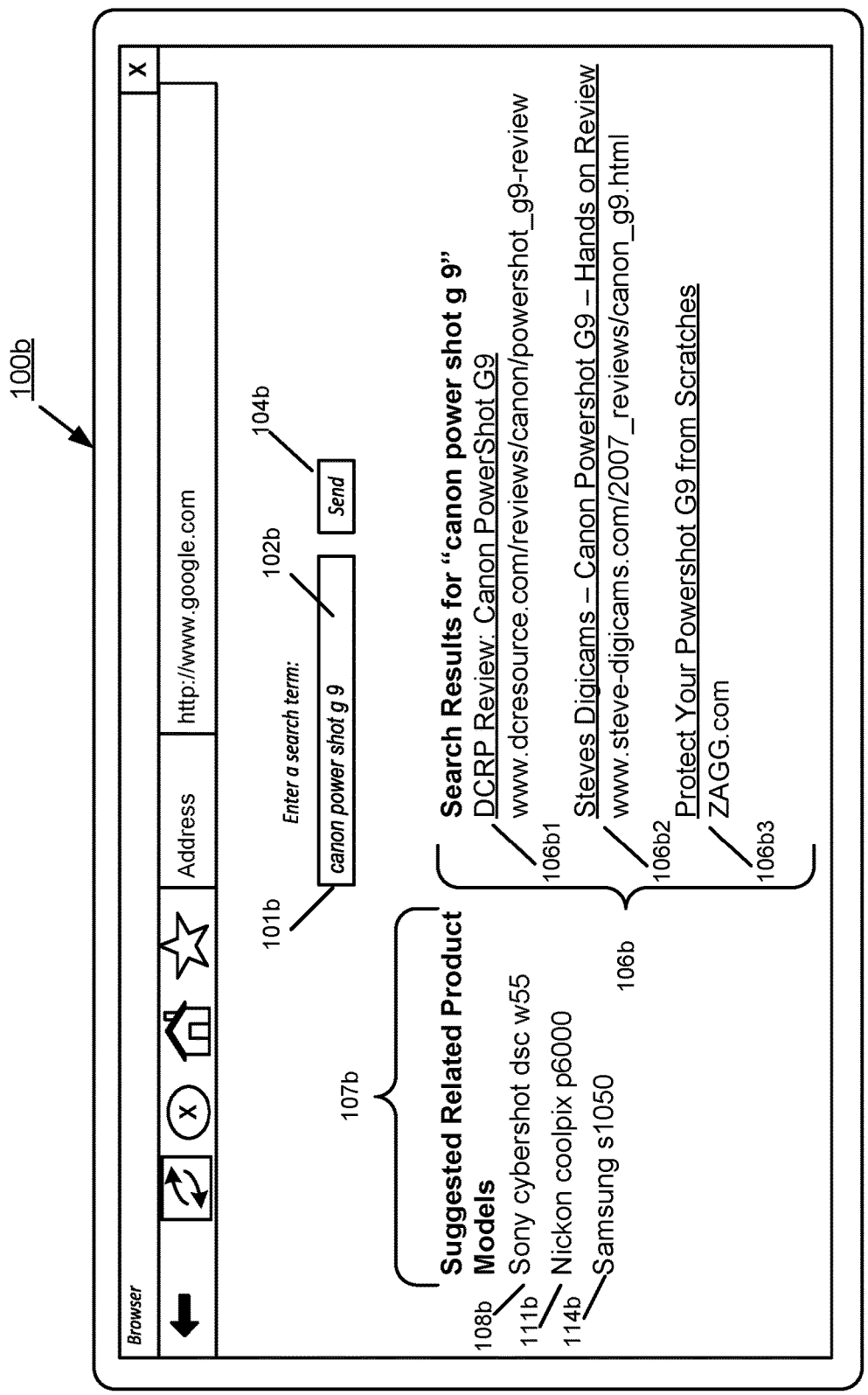
FIG. 1B shows an example GUI for a search engine that can accept a product query, and can provide related product search suggestions and search results for the product query.

FIG. 1B shows an example of a GUI 100b for a search engine or other process that accepts queries specifying product names for product items, where a product name can be a product brand and/or a product model, and in response provides search suggestions for related product models. Related product models are, for example, product models having similar attributes. Attributes are characteristics, properties or features of a product category (e.g., camera, laptop) or product models. For example, "Canon powershot g9" and "Nikon coolpix p6000" are related product models for a product category "camera." These two product models "Canon powershot g9" and "Nikon coolpix p6000", for example, share a set of similar attributes such as "3× optical zoom," "4 Megapixels (MP)" and a price range "$200-$300."

By way of illustration, the GUI 100*b* can include a search field 101*b* and a send button 104*b*. Users enter, for example, query 102*b* "canon power shot g 9" that specifies a product name for a product item into the search field 101*b* and then select the send button 104*b* to cause the search engine to search a corpus of documents for documents that are responsive to the query. A corpus is space of documents that a search engine can access such as the World Wide Web or a database, for instance. In some implementations, the GUI 100*b* is implemented by a web browser or a software application having web browsing capability. Other GUI's are possible, including those that accept voice, touch, or gesture input. Moreover, some implementations provide a programmatic interface (e.g., an application programming interface) for the search engine rather than a user interface.

The search engine provides a result list 106*b* of documents (e.g., by document title) that are responsive to the query 102*b*. In this illustration, the result list 106*b* includes, for example, a document entitled "DCRP Review: Canon PowerShot G9" 106*b*1, "Steves Digicams—Canon Powershot G9—Hands on Review" 106*b*2, and "Protect Your Powershot G9 from Scratches" 106*b*3. The result list 106*b* can also contain a universal resource locator (URL) for each document reference. For example, "ZAGGcom" is the URL for the document reference "Protect Your Powershot G9 from Scratches" 106*b*3. If a user selects (e.g., using with a mouse or other input device such as a keyboard, microphone, camera, touch panel, and so on) the document "Protect Your Powershot G9 from Scratches" 106*b*3 from the list 106*b*, the selection will cause the GUI 100*b* to present the associated document for viewing. Other relevant product data may be presented in the result list 106*b*, e.g., product ratings, product reviews or product previews.

When the query 102*b* specifies a product model, a list 107*b* of suggested related product models that are similar to the specified product model specified are also provided by the search engine or other process. The list 107*b* includes, for example, a set of suggested related product models "Sony cybershot dsc w55" 108*b*, "Nikon coolpix p5000" 111*b*, and "Samsung s1050" 114*b*. The product models "Sony cybershot dsc w55" 108*b*, "Nikon coolpix p5000" 111*b*, and "Samsung s1050" 114*b* have a set of similar attributes that belong in a set of important product attributes for a given category. In this case, it was determined that a product category "digital camera" corresponds to the query 102*b* "canon power shot g 9," and certain attributes, e.g., "Megapixels," "Zoom," "Video Mode," and "Price" are considered important category attributes for the category "digital camera."

For example, the related product models 108*b*, 111*b*, and 114*b* share a set of similar attributes such as "4 megapixels," "3× optical zoom" and "video mode." These attributes also satisfy the product category attributes "megapixels," "optical zoom" and "video mode" that correspond to the product category "camera." Users can select, for example, the related product model 108*b* "Sony cybershot dsc w55" from the result list 107*b*. The selection of the related product model 108*b* "Sony cybershot dsc w55" then causes the search engine to search for documents relevant to the suggested related product model 108*b*.

Figure 1C:
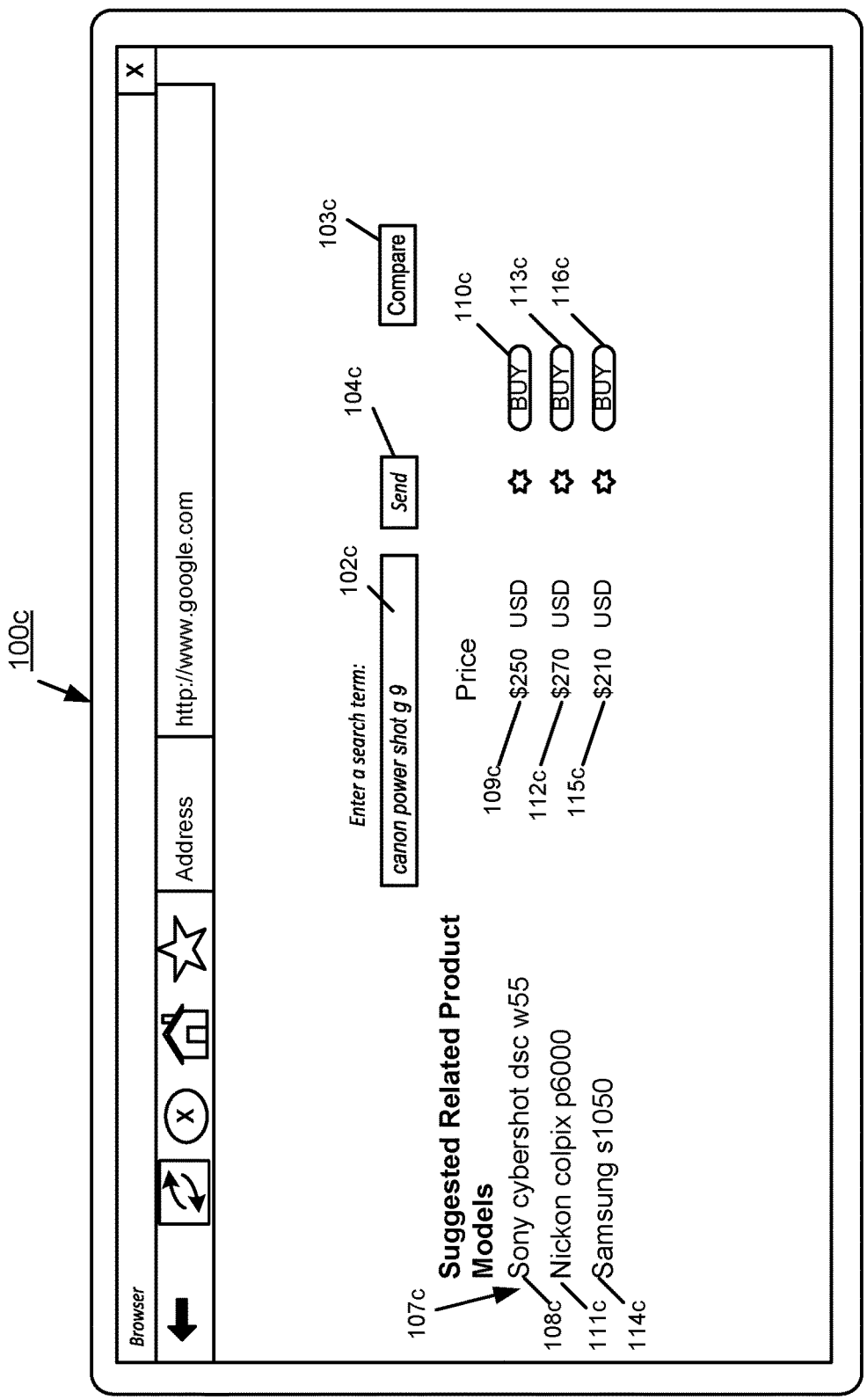
FIG. 1C shows an example GUI for a search engine that can accept a product query, and can provide a list of related product search suggestions and respective selectable links that can allow users to purchase the associated related product models, or compare the associated related product models and other product models.

FIG. 1C shows an alternative example of the GUI 100*b* of FIG. 1B. In response to a user query 102*c* "canon power shot g 9," a list 107*c* of suggested related product models "Sony cybershot dsc w55" 108*c*, "Nikon coolpix p6000" 111*c*, and "Samsung s1050" 114*c* is returned as described with respect to GUI 100*b*. For the related product models 108*c*, 111*c*, and 114*c*, their respective prices "$250" 109*c*, "$270" 112*c*, and "$210" 115*c* and respective selectable "buy" buttons (e.g., hyperlinks) 110*c*, 113*c*, and 116*c* are also presented. A user can select, for example, the "buy" button 110*c* which will cause the GUI 100*c* to present a webpage where the user can purchase the "Sony cybershot dsc w55" 108*c* for $250.00. In some implementations, a result list such as 106*b* is shown together with the list 107*c* of related product models and their respective prices.

In other implementations, a user can select the "compare" button (e.g., link 103*c*) which will cause the GUI 100*c* to present a user interface where the user can view one or more of product ratings, product reviews, product previews and other related information associated with the related product models. The "compare button" 103 can enable easy comparison between the related product models before purchase of a related product model.

As discussed in regards to FIG. 1B, a user that is presented with the list 107*c* of suggested related product models can also, for example, select the related product model 108*c* "Sony cybershot dsc w55" to search a corpus of documents (e.g., the web) for documents relevant to the selected related product model 108*c*.

In various implementations, in response to the query 102*c* the search engine or another process, retrieves the prices 109*c*, 112*c*, and 115*c* corresponding respectively to the suggested related product models "Sony cybershot dsc w55" 108*c*, "Nikon coolpix p6000" 111*c*, and "Samsung s1050" 114*c*, from a product database populated by multiple merchants or manufacturers of the products. In other implementations, the search engine obtains, for example, the price 109*c* for the related product model 108*c* "Sony cybershot dsc w55" from a website that directly sells the related product model 108*c*.

Figure 2:
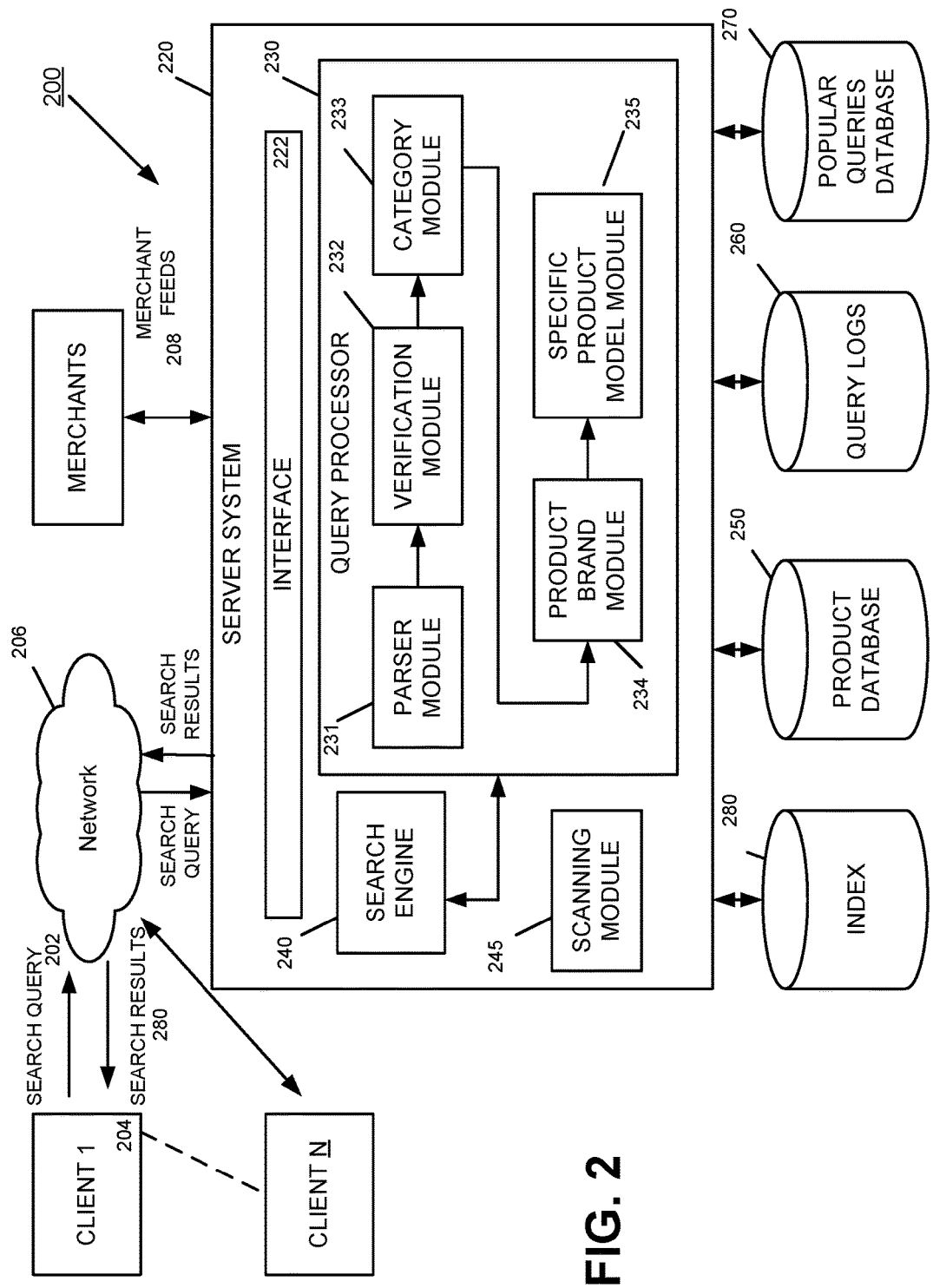
FIG. 2 is a block diagram of an example system configured to provide a list of related product suggestions in response to a product query.

FIG. 2 is a block diagram of an example system 200 configured to provide related product model search suggestions in response to product queries. Although several logical software components are illustrated, there may be fewer or more components than shown in the system 200. Moreover, the components can be distributed across a plurality of computing devices connected by one or more networks or other suitable communication means. Users can interact with the system 200 through a client device 204 such as a personal computer or other devices (e.g., wireless devices such as mobile phones and personal digital assistants). Client device 204 communicates with the server system 220 through one or more communication networks such as network 206. Users or processes submit product queries 202 to the server system 220. Product queries 202 can specify product names for product items, where product names can be product brands and/or product models. For example, a query can be "canon power shot g 9."

The server system 220 includes an interface 222 that is used to communicate with the network 206 and one or more merchant feeds 208. The interface 222 can be a web server that communicates with one or more clients (e.g., 204, 208) over the Internet. The interface 222 can also provide hypertext markup language (HTML) formatted web pages to the clients. A web browser may interpret these web pages for display on the client, for example. The displayed pages may function as a GUI for the server system 220, with the client 204 functioning as a user interface device, for instance. The interface 222 accepts queries 202 from the client 204 and, in turn, provides the queries to a query processor 230 for processing.

The server system 220 interacts with a search engine 240. In various implementations, the search engine 240 is able to search various data sources, for example, a corpus of documents (e.g., the web), a product database 250, a query logs 260 (e.g., previously submitted queries), and a popular product queries database 270. One or more indexes 280 are used by the search engine 240 and other processes to access these data sources.

In various implementations, the product database 250 includes a collection of product categories, respective product brands and product models corresponding to the product brands, and sets of attributes associated with the product categories. For example, a product database can include a collection of product categories such as "camera," or "laptop", a collection of product brands such as "Sony", "Nikon", "Dell", or "Lenovo", respective product models such as "Sony cybershot dsc w55", and "Dell Inspiron 1150", a collection of attributes such as "megapixels (MP)", "optical zoom", or "lens" corresponding to the product category "camera", and attributes such as, for example, "cpu type", "cpu clock speed" and "memory" corresponding to the product category "laptop".

The product database 250 comprises product listings and product related information that are submitted, for example, by several merchant feeds 208 (e.g., product ratings, product reviews, product previews). Merchant feeds 208 provide information about products such as technical specifications and prices. Information received on merchant feeds 208 can come from different sources such as servers for merchant systems, servers that aggregate product information from variety of sources, and systems that crawl shopping web pages to aggregate this information. The product information can be provided as Extensible Markup Language (XML) documents, for example.

The query logs 260 comprise prior queries received by the server system 220 from all users, one or more group of users, and/or individual users. For instance, the query logs 260 can include one or more queries received from the client 204 or from other clients such as client N. The popular product queries database 270 can include product models, brands, or both that have been identified as popular based on an analysis of the query logs 260. A scanning module 245 scans the query logs 260 to identify occurrences of product names for product items, where product names can be model and/or brand names in the prior queries. In some implementations, if a product model, a product brand, or both occur a predetermined or dynamically determined number of times within a given time period, they are included in the popular product queries database 270. Other ways for determining whether a query is popular are possible.

In further implementations, the popular product queries database 270 can also be automatically updated with product brands and/or models associated with specific proposed search suggestions or product pages presented in search results that users have clicked on.

A query parser module 231 parses the queries 202 that specify product names to identify product brands, product models, or both specified in the queries. Generally, a query includes one or more terms. For example, a query "canon power shot g 9," includes the terms "canon," "power," "shot," "g," and "9." The parser module 231 can identify that the term "canon" correspond to a brand and the rest of terms "power shot g 9" correspond to a model. The parser 231 can also identify that the one or more terms of a query correspond to either a brand or a product. For example, a query "Sony Vaio" includes two terms "Sony" and "Vaio". The parser 231 can identify that both terms together correspond to a brand. If only a product model is specified in the query, the corresponding brand can be determined from the product database 250, for example. After the parser module 231 identifies a brand, a model, or both in a query, the parser model 231 provides this information to a verification module 232.

In various implementations, the verification module 232 invokes the search engine 240 or other processes to match the brand identified from the query 202 by the parser module 231 with a brand provided in the popular product queries database 270. A brand match occurs, for example, when one or more terms for the brand specified in the query 202 matches one or more terms of a product brand in the database 270. The search engine 240 can then select among the product model queries associated with the product brand in the database 270, a product model query that matches the product model that the parser module 231 has identified in the model section of the query. For example, the user specified product model "power shot g 9" can be matched, in the database 270, to a product model "powershot g9" because both queries contain the same string of characters.

In some implementations, the query 202 comprises only information concerning a brand. The verification module 232 then invokes the search engine 240 to match one or more terms for the brand specified in the query 202 with one or more terms of a product brand in the database 270. The search engine 240 can then select, among the product model queries associated with the product brand in the database 270, the product model that has been identified as the most popular. The query processing 230 can use the most popular product model identified in the database 270 as a user specified product model in further processing of the query 202.

In other implementations, the verification engine 232 can invoke the search engine 240 or other process to search a product database (e.g., the product database 250) to identify the product brand and/or the product model specified in the query 202 for a product item. The product database 250 can, for example, include product information provided by merchants 208. Each product brand, which can include one or more terms, can be associated with one or more product models. For example, a product brand such as "canon" can be associated with its product models such as "powershot g10," "powershot sx1 IS," and "powershot sx10 IS."

The verification module 232 utilizes the search engine 240 or other process to identify, in the product database 250, for example, a product brand that matches the product brand specified in the query 202. A brand match can occur, for example, between the product brand one or more terms specified in the search query 202 and the terms of a product brand provided by merchant feeds 208 in the product database 250. For example, a user specified product brand "cannon" is a brand match of the product brand "canon" provided in the product database 250 because the product brand "canon" is the correct spelling of the user specified product brand "cannon" based on statistical data analysis of the product database, or other data mining and analysis techniques.

The verification module 232 can then utilize the search engine 240 or other process to select, in the product database 250, from among the different product models provided for the matched product brand, a product model whose terms match the user specified product model. For example, the user specified product model "power shot g 9" can be matched, in the product database 250, to a product model "powershot g9" because both strings contain the same terms.

The query processor 230 can also include a category module 233 for determining a product category, e.g., "digital camera," for the identified product brand and model. The category module 233 can determine, for example, the product category in the product database, or based on other analysis techniques. For example, the category module 233 can determine that the product descriptions specified in the user query 202 are also associated with the category "digital camera" in the product database 250.

The category module 233 determines the product category attributes based on one or more attributes associated with the product name specified in the search query 202. Indeed, the user query 202 can include one or more attributes of the specified product model and/or the specified product brand. For example, for a query "canon power shot g 9," users may have commonly specified attributes such as "3× optical zoom," and "4 Megapixels."

The category module 233 can also cause the search engine 240 or another process to identify attribute values of the user query 202 specified product model (or the product model that has been identified as the most popular in the database 270) that occurred in prior queries submitted by users (e.g., the query logs 260). For example, the query logs 260 can include prior product queries and also attribute values of those products that users entered in the prior queries (e.g., "4 MP" for a camera model, "256 Mb RAM" for a laptop).

In some implementations, the category module 233 causes the search engine 240 or other process, using the identified attributes of the user query 202 specified product model (or the product model that has been identified as the most popular in the database 270) to select, for example, a product category in the product database 250 for the product model. The identified product category can have a predefined set of attributes. Each product category is provided with attributes that characterize the product category. For example, a product category such as "laptop" can be provided with its associated attributes such as "processor," "RAM," and "weight."

In various implementations, the predefined category attributes can be provided by users of the system 200, a system administrator, merchandisers or manufacturers of the product items that are included in the product database 250. For example, the system administrator can provide for the product category "digital camera" attributes such as "MP", "Zoom" and "Video Mode".

A product category "digital camera" can be provided in the product database 250 with attributes such as "optical zoom," and "Megapixels." For example, the search engine 240 matches the attributes "3× optical zoom," "4 Megapixels" of the query "canon powershot g 9" with the attributes "optical zoom," and "Megapixels" provided in the product database 250 for the product category "camera." The search engine 240 or other process thus determines that the product category "digital camera" is the product category for the product query "canon power shot g 9."

The query processor 230 can also include a product brand module 234. The product brand module 234 can identify one or more product brands of the product category determined by the category module 233. These product brands can be different from the product brand that may have been specified in the user query 202. In some implementations, the product brand module 234 can select the product brands from a set of predetermined or dynamically determined product brands (e.g., product brands provided in the product database 250). For example, the product brand module 234 can search the product database 250 for product brands provided under the product category determined by the category module 233.

In other implementation, the brand module 234 can search the popular product queries database 270 to identify one or more product brands for the product category that have been determined by the category module 233. The brand module 234 can select the product brands based on the number of times documents relevant to the respective product brands are selected by users as results for one or more of the prior queries.

Yet, in another implementation, the brand module 234 can, because of a promotion, select one of the product brands. For example, the promotion can be information associated with the brand such as a special offer to purchase the product or an advertisement. In another example, the promotion can also be information associated with a given product model for the brand. In another example, the product brand module 234 can select a product brand because a business entity that sells the product brand makes a special offer via a promotion enticing users to conduct business with the business entity regarding the product brand.

The query processor 230 also includes a product model module 235 that can, for each product brand determined by the product brand module 234, identify one or more product models that have attributes that satisfy the predetermined or dynamically determined category attributes. The product model module 235 can cause the search engine 240 or another process to search in the product database 250, for corresponding product models of a product brand that satisfy the category attributes. For example, in the product database 250, the product category "digital camera" can include product brands such as "Canon," "Sony," and "Nikon." For the product brand "Sony," the product model "Sony cybershot dsc w55" can have attributes such as "3× optical zoom," "4 Megapixels (MP)" and a price range "$200-$300" that satisfy the category attributes for the category "digital camera" for instance. These attributes can also be similar to the attributes of the selected or queried product model (e.g., query 202). The query processor 230 can provide one or more of the identified respective product models (e.g., as product suggestions) in response to the query 202.

In some implementations, the product model module 235 can cause the search engine 240 or another process to search in a database (e.g., the product database 250), for the user query 202 specified product brand, and identify as related product models, other product models from the user query 202 specified product brand that are "nearby" product models with respect to the user query 202 specified product model. Nearby product models, with respect to the user query 202 specified product model, are other product models from the user query 202 specified product brand that can be determined by a "distance" between attributes (e.g., variation between attribute values of same attributes) of the user query 202 specified product model and the other product models. A distance algorithm computes distance between attributes of two product models.

The product model module 235 can then cause the search engine 240 or another process to return as related product models, the other product models of the user query 202 specified product model for which the distance between their attributes and attributes of the specified product model satisfies a criterion (e.g., the nearest distance, distance between attributes is within a predetermined or dynamically determined range). For example, the user query 202 has specified attributes "8 MP", "3× zoom" for a product model query "canon powershot g 9," thus, the product model module 235 can return as related product models, other product models of the product brand "canon" that are associated with attributes "7 MP" and/or "4× zoom".

In other implementations, the query processor 230 can provide a first product model based on a promotion associated with the first product model that allows a preference of this particular first product model over the other first product models. The interface 222 can forward the product suggestions (search results 280) to the client 204, where the results can be displayed to the user.

In further implementations, the query processor can compute a distance between attributes of the user query 202 specified product model and of the one or more product models identified by the product model module 235 in the product database 250. A notion of "distance" or "similarity" can be associated with each attribute. For example, a "3× optical zoom" may be considered similar to a "4× optical zoom" for the attribute "zoom," while a "20× optical zoom" may be considered too dissimilar. The query processor 230 can then provide one or more of the identified respective product models (e.g., as related product suggestions) for which the attributes are similar or only slightly dissimilar to the category attributes if the attribute "price" associated with the identified respective product model is within a predetermined or dynamically determined threshold.

In some implementations, the interface 222 can not only forward to the client 204 the product suggestions, but also forward a respective price for each related product model. In another implementation, the interface 222 can forward, to the client 204, the related product models suggestions (search results 280), a respective price for each related product model, and further a corresponding selectable link to purchase the associated related product model. In other implementation, a user selection in the client 204 of a product model suggestion or of its respective price can allow the purchase of the product model.

In various implementations, the interface 222 can also present to the client 204 product ratings, product reviews, product previews or a comparison shopping link (e.g., "compare" button 103c) that can allow comparing the related product models and additional product models before purchase. Product ratings, product reviews and product previews can be included in the product database and can be provided by merchants 208. For example, a user selection in the client 204 of a product model suggestion or of its respective price can also present in the client 204 information associated with the selected product model such as product ratings, reviews, previews, and comparison data between the selected product model and other product models.

Figure 3:
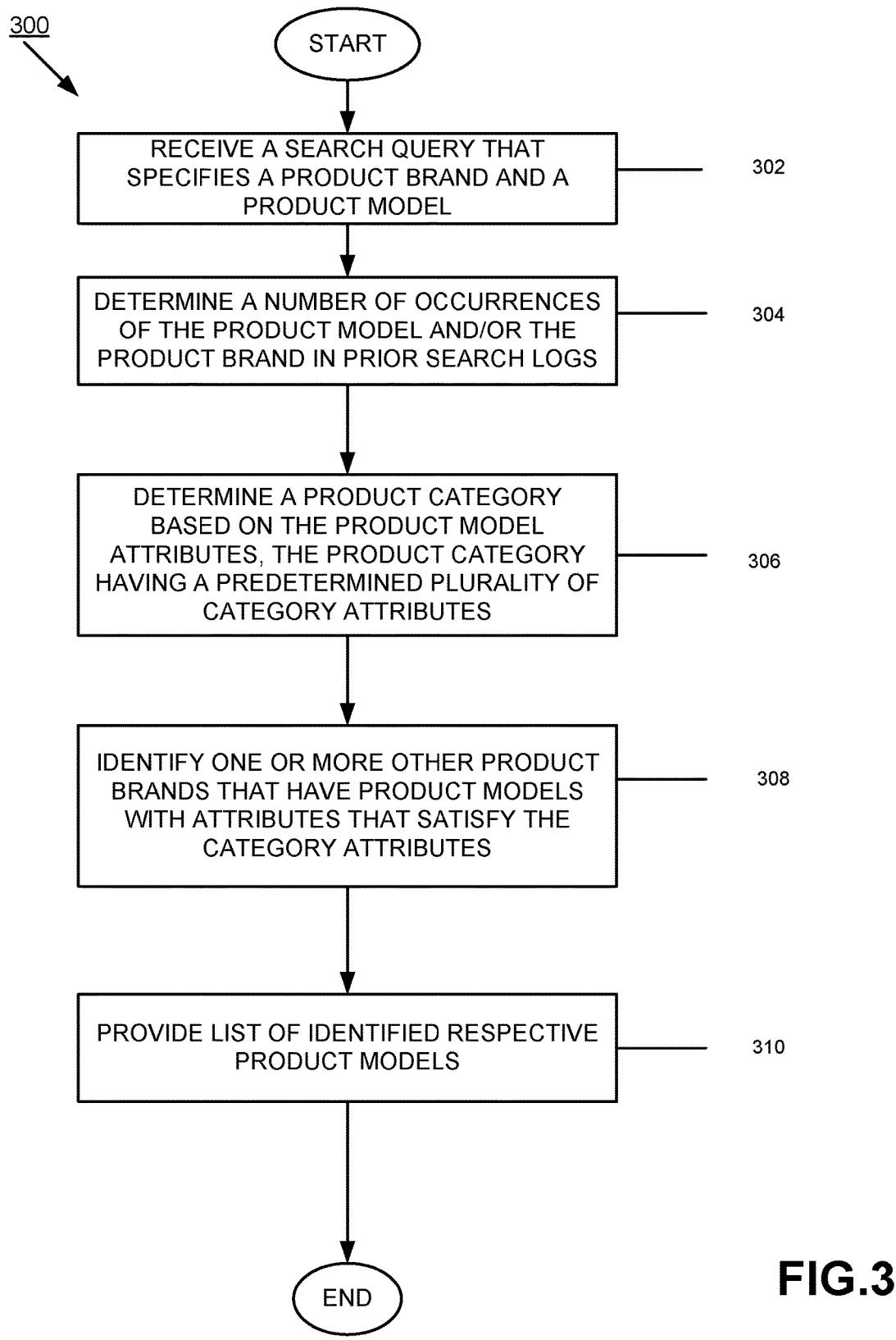
FIG. 3 is a flowchart of an example technique for providing related product suggestions in response to a product query.

FIG. 3 is a flow chart describing a technique 300 for providing related product search suggestions in response to a product query. The technique will be described in reference to a system, e.g., a server system that performs the method. The system receives a query, submitted by a user, which specifies a product name for a product item, where the product name can be a product brand and/or a product model (step 302). The query can include one or more terms. For example, the query can be "canon power shot g 9." And, the query can be for searching documents (e.g., Web pages).

The system matches the product brand and/or the product model specified in step 302 with a product brand and/or a product model contained in a database (e.g., query logs 260) (step 304). For example, the system determines the number of occurrences of a product brand "canon," the number of occurrences of the product model "power shot g 9" or the number of occurrences of the query "canon power shot g 9" in a plurality of prior queries, and verifies that the number of occurrences satisfies a criterion. If a model is not specified, a popular model for the specified brand can be used by default.

The system determines a product category in step 306 corresponding to the product brand and/or the product model matched in step 304. For example, the user has specified the query "canon power shot g 9," which has attributes such as "3× optical zoom," and "4 Megapixels" in the product database 250 corresponding to the important category attributes (Zoom, Megapixels). Based on the above attributes associated with the product model "canon power shot g 9," the system determines that the product category "digital camera" is the product category corresponding to the product model "canon power shot g 9." For example, the system matches the above attributes associated with the user query "canon power shot g 9" with a predetermined plurality of attributes "optical zoom" "Megapixels," and "video mode." The predetermined plurality of attributes correspond to a product category "digital camera," and are, for example, provided in a product database by manufacturers of products.

In step 308, the system identifies one or more other product brands whose product models have attributes that match the predetermined category attributes from step 306. For example, other product brands such as "Sony," "Nikon," and "Samsung" and their respective product models "Sony cybershot dsc w55," "Nikon coolpix p6000," and "Samsung s1050" can be identified. The respective product models have, for example, similar attributes such as "3× optical zoom," and "4 Megapixels." The system can provide in step 310 the respective product models in response to the query from step 302.

Figure 4:
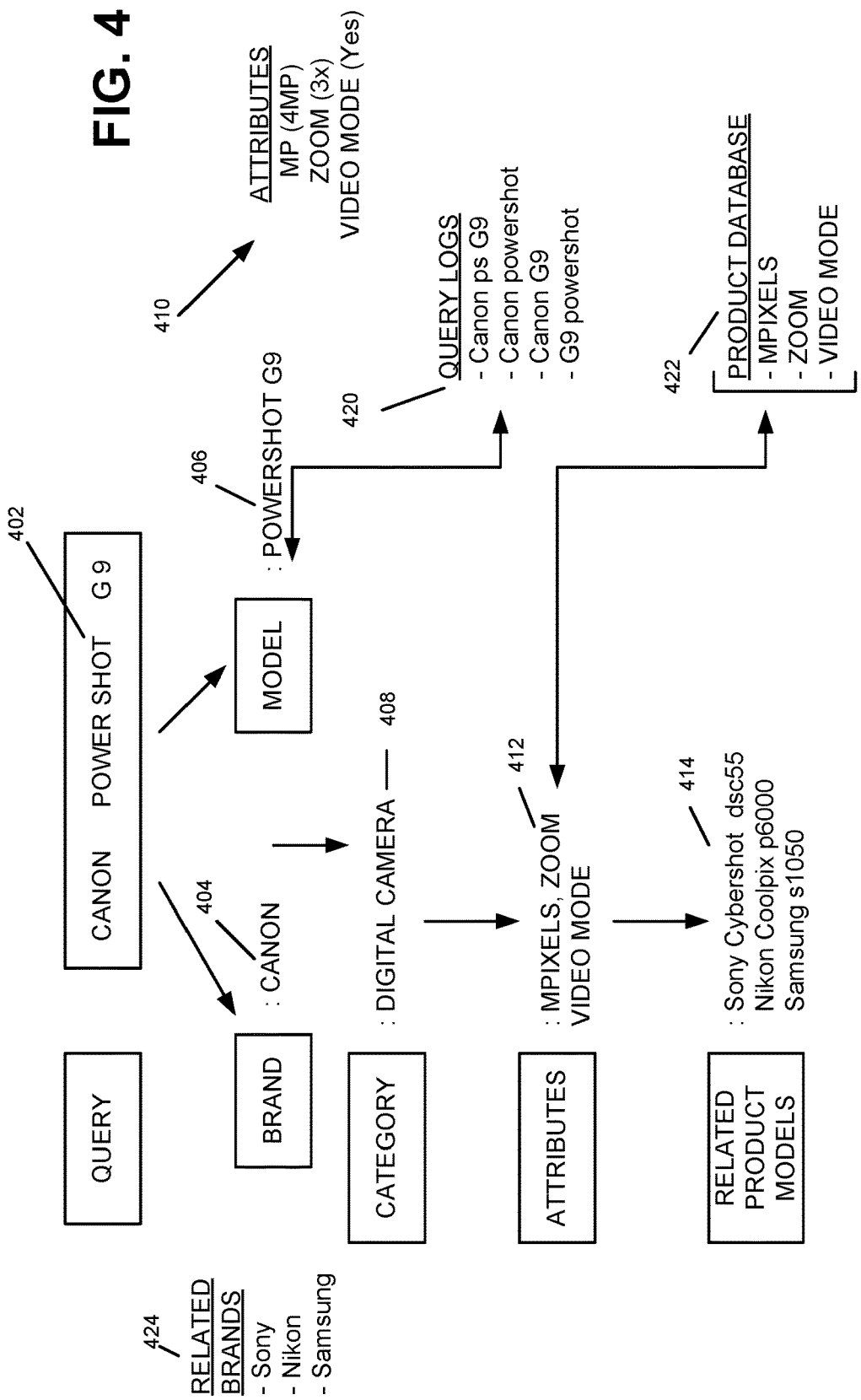
FIG. 4 is a diagram for an example system that can provide related product suggestions.

FIG. 4 is a diagram illustrating an example of providing related search suggestions for products in response to a user product query 402 "canon power shot g 9". The example will be described in reference with the system 200 of FIG. 2. For example, the parser module 231 can be invoked to determine in the query 402 "canon power shot g 9" the sections or terms corresponding to "brand" and "model". The verification module 232, using information from the parser module 231 regarding "brand" and "model" sections in the query 402 "canon power shot g 9", determines that the term "canon" is the product brand 404 for the product query 402 and the set of terms "power shot g 9" describes a product model 406 "powershot G9" for the product brand 404.

For example, the verification module 232 can make the above determination by searching query logs 420 that can include prior product queries submitted by users such as "canon ps G9," "canon powershot," "canon G9," and "G9 powershot." The product model 406 "powershot G9" for the product brand 404 "canon" has a set of attributes 410 that includes "4 MP," "image stabilizer," and "3× optical zoom."

The category module 233 can then be invoked to determine in a product database 422 (e.g., product database 250) that the product brand 404 "canon" and the product model 406 "powershot G9" correspond to a product category 408 "digital camera," as each entry in a product database is associated with a product category.

In various implementations, the category module 233 can be invoked to determine, based on attributes 410 "4 MP," "Image stabilizer," and "3× optical zoom" that the brand 404 "canon" and model 406 "powershot g9" correspond to the product category 408 "digital camera". The product category 408 "digital camera" is identified as having, for example, a predetermined plurality of category attributes 412, "MP," "Zoom," "VIDEO MODE," with respective values "4 MP," "3×", and "Yes." The predetermined plurality of category attributes 412 can be a set of attributes that are provided in the product database 422 (e.g., product database 250) by manufacturers of products.

The brand module 234 and the specific product model module 235 are then respectively invoked to determine other brands 424 (e.g., SONY, NIKON, SAMSUNG; which can be included a product database (product database 250), for the product category 408 "digital camera" and their respective specific product models. The respective product models "Sony cybershot dsc55," "Nikon coolpix p6000," and "Samsung s1050" are determined to have attributes similar to the product category "digital camera" attributes 412: "4 MP," "video mode," and "3× optical zoom." The interface 222 can then provide to the user the product models "Sony cybershot dsc55," "Nikon coolpix p5000," and "Samsung s1050" in response to the user query as, for example, a list 414 of related search suggestions for products.

Figure 5:
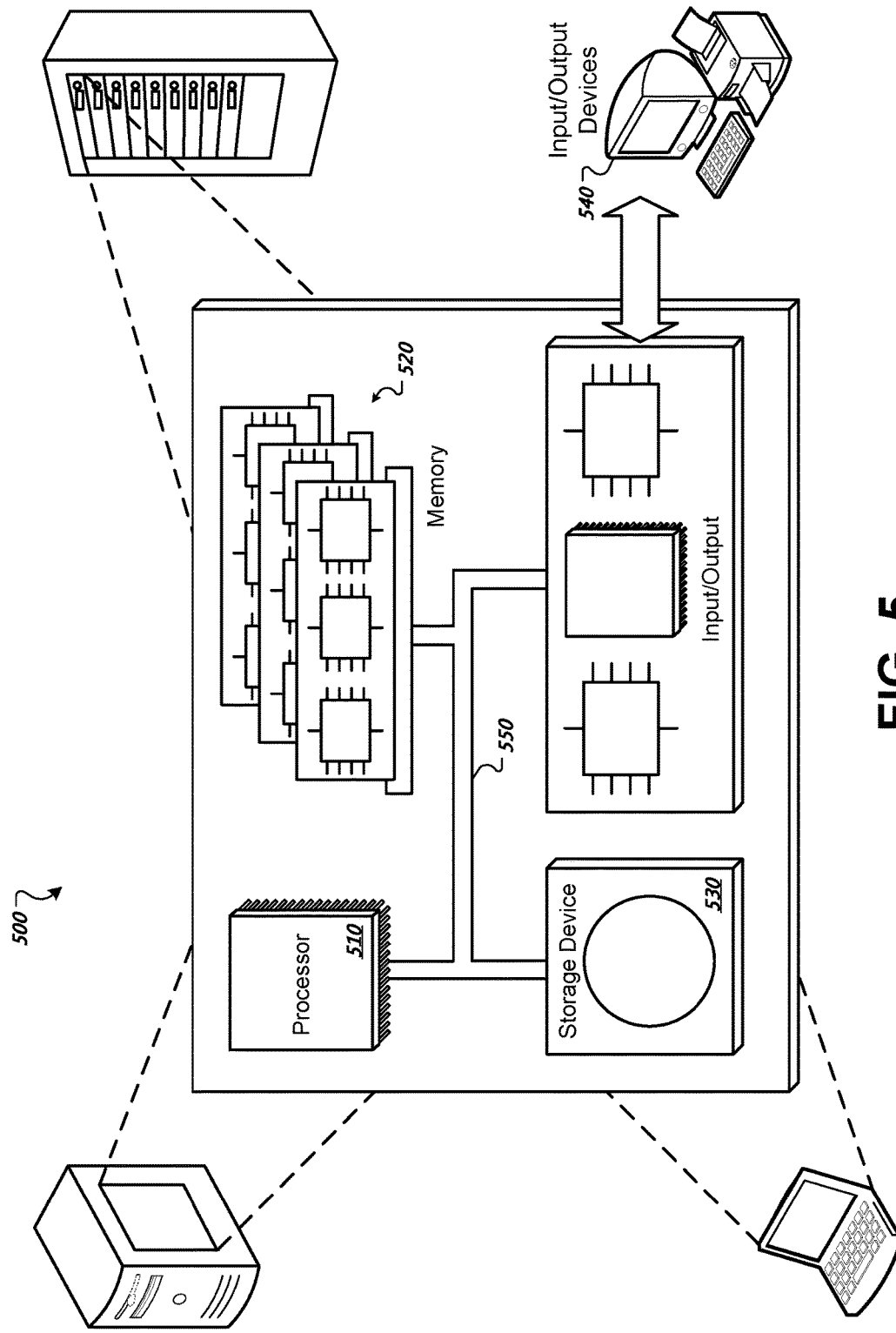
FIG. 5 is a block diagram of an example computing system that can be used in connection with computer-implemented methods described in this document.

FIG. 5 is a schematic diagram of an example computer system 500. The system 500 can be used for practicing operations described above. The system 500 can include a processor 510, a memory 520, a storage device 530, and input/output devices 540. Each of the components 510, 520, 530, and 540 are interconnected using a system bus 550. The processor 510 is capable of processing instructions within the system 500. These instructions can implement one or more aspects of the systems, components and techniques described above.

In some implementations, the processor 510 is a single-threaded processor. In other implementations, the processor 510 is a multi-threaded processor. The processor 510 can include multiple processing cores and is capable of processing instructions stored in the memory 520 or on the storage device 530 to display graphical information for a user interface on the input/output device 540.

The memory 520 is a computer readable medium such as volatile or non volatile that stores information within the system 500. The memory 520 can store processes related to the functionality of the query processor 230, for example. The storage device 530 is capable of providing persistent storage for the system 500. The storage device 530 can include a floppy disk device, a hard disk device, an optical disk device, or a tape device, or other suitable persistent storage mediums. The storage device 530 can store the various databases described above. The input/output device 540 provides input/output operations for the system 500. The input/output device 540 can include a keyboard, a pointing device, and a display unit for displaying graphical user interfaces.

The computer system shown in FIG. 5 is but one example. In general, implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, e.g., one or more modules of computer program instructions encoded on a computer readable medium for execution by, or to control the operation of, one or more data processing apparatus.

The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks.

However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations can be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the invention have been described. Other implementations are within the scope of the following claims. For example, the actions recited in the claims can be performed in a different order and still achieve desirable results. Moreover, the server environment, which is configured to provide electronic search service and employ the ranking systems and techniques described, need not be implemented using traditional back-end or middleware components. The server environment can be implemented using a program installed on a personal computing apparatus and used for electronic search of local files, or the server environment can be implemented using a search appliance installed in an enterprise network.

What is claimed is:

1. A method for determining alternative product queries, the method comprising:
   providing, by one or more computers through a graphical user interface, a search field configured to receive a search query;
   receiving, via the search field from a given user, a given query that specifies a first brand of a first product;
   selecting, as a query term for the given query, a first product model number from a stored set of popular product queries based on the first brand being specified by the given query;
   selecting, by the one or more processors and in response to receipt of the given query, a suggested product that has one or more same attributes as products in a determined same product category as the first product and has a model number included in the stored set of popular product queries, wherein the suggested product is different than the first product and has a model number that differs from the first product model number and a brand that differs from the first brand; and
   in response to the given query that specifies the first brand of the first product:
      providing, by the one or more computers within a first region of the graphical user interface, a search result that visually identifies the suggested product; and
      providing, by the one or more computers within a second region of the graphical user interface, one or more search results that visually identify the first product, wherein the one or more search results that visually identify the first product include at least a URL configured to present an associated document corresponding to the URL for viewing through the graphical user interface.

2. The method of claim 1 wherein the given query comprises one or more of a product brand and a product model.

3. The method of claim 2 wherein the given query comprises the product brand, the method further comprising: identifying as the suggested product, a popular product model associated with the product brand.

4. The method of claim 1 wherein attributes of the first product are received from one or more of: a user, a system administrator, a merchandiser, or a manufacturer of the product.

5. The method of claim 1 wherein selecting the suggested product is based on a number of times that documents containing the suggested product are selected by various users from results responsive to one or more of the stored set of popular product queries.

6. The method of claim 1, further comprising receiving input selecting the suggested product and causing documents to be searched for the suggested product.

7. The method of claim 1 wherein the given query comprises a product brand and a product model, wherein selecting the suggested product comprises selecting one or more other product models of the product brand, and wherein a distance between attributes of the one or more other product models and the product model satisfies a criterion.

8. A non-transitory computer-readable medium storing instructions, that when executed, cause one or more processors to perform operations including:
   providing, through a graphical user interface, a search field configured to receive a search query;
   receiving, via the search field from a given user, a given query that specifies a first brand of a first product;

selecting, as a query term for the given query, a first product model number from a stored set of popular product queries based on the first brand being specified by the given query;

selecting, in response to receipt of the given query, a suggested product that has one or more same attributes as products in a determined same product category as the first product and has a model number included in the stored set of popular product queries, wherein the suggested product is different than the first product and has a model number that differs from the first product model number and a brand that differs from the first brand; and in response to the given query that specifies the first brand of the first product:

providing, within a first region of the graphical user interface, a search result that visually identifies the suggested product; and providing, within a second region of the graphical user interface, one or more search results that visually identify the first product, wherein the one or more search results that visually identify the first product include at least a URL configured to present an associated document corresponding to the URL for viewing through the graphical user interface.

9. The non-transitory computer-readable medium of claim 8 wherein the given query comprises one or more of a product brand and a product model.

10. The non-transitory computer-readable medium of claim 9 wherein the given query comprises the product brand, and wherein the instructions cause the one or more processors to perform operations further comprising: identifying, as the suggested product, a popular product model associated with the product brand.

11. The non-transitory computer-readable medium of claim 8 wherein attributes of the first product are received from one or more of: a user, a system administrator, a merchandiser, or a manufacturer of the product.

12. The non-transitory computer-readable medium of claim 8 wherein selecting the suggested product is based on a number of times that documents containing the suggested product are selected by various users from results responsive to one or more of the stored set of popular product queries.

13. The non-transitory computer-readable medium of claim 8, wherein the instructions cause the one or more processors to perform operations further comprising receiving input selecting the suggested product and causing documents to be searched for the suggested product.

14. The non-transitory computer-readable medium of claim 8 wherein the given query comprises a product brand and a product model, wherein selecting the suggested product comprises selecting one or more other product models of the product brand, and wherein a distance between attributes of the one or more other product models and the product model satisfies a criterion.

15. A system comprising:
one or more processors; and
one or more memory devices storing instructions that, when executed, cause the one or more processors to perform operations comprising:

providing, through a graphical user interface, a search field configured to receive a search query;

receiving, via the search field from a given user, a given query that specifies a first brand of a first product;

selecting, as a query term for the given query, a first product model number from a stored set of popular product queries based on the first brand being specified by the given query;

selecting, in response to receipt of the given query, a suggested product that has one or more same attributes as products in a determined same product category as the first product and has a model number included in the stored set of popular product queries, wherein the suggested product is different than the first product and has a model number that differs from the first product model number and a brand that differs from the first brand; and in response to the given query that specifies the first brand of the first product:

providing, within a first region of the graphical user interface, a search result that visually identifies the suggested product; and providing, within a second region of the graphical user interface, one or more search results that visually identify the first product, wherein the one or more search results that visually identify the first product include at least a URL configured to present an associated document corresponding to the URL for viewing through the graphical user interface.

16. The system of claim 15 wherein the given query comprises one or more of a product brand and a product model.

17. The system of claim 16 wherein the given query comprises the product brand, and wherein the instructions cause the one or more processors to perform operations further comprising: identifying, as the suggested product, a popular product model associated with the product brand.

18. The system of claim 15 wherein attributes of the first product are received from one or more of: a user, a system administrator, a merchandiser, or a manufacturer of the product.

19. The system of claim 15 wherein selecting the suggested product is based on a number of times that documents containing the suggested product are selected by various users from results responsive to one or more of the stored set of popular product queries.

20. The system of claim 15, wherein the instructions cause the one or more processors to perform operations further comprising receiving input selecting the suggested product and causing documents to be searched for the suggested product.

* * * * *